United States Patent
Xu et al.

(10) Patent No.: US 10,366,040 B2
(45) Date of Patent: Jul. 30, 2019

(54) WEARABLE DEVICE

(71) Applicant: Huawei Technologies Co., Ltd., Shenzhen (CN)

(72) Inventors: Liangguang Xu, Xi'an (CN); Nannan Li, Shenzhen (CN); Dong Chen, Xi'an (CN); Xin Lv, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/565,260

(22) PCT Filed: Jul. 12, 2016

(86) PCT No.: PCT/CN2016/089817
§ 371 (c)(1),
(2) Date: Oct. 9, 2017

(87) PCT Pub. No.: WO2017/008735
PCT Pub. Date: Jan. 19, 2017

(65) Prior Publication Data
US 2018/0314669 A1    Nov. 1, 2018

(30) Foreign Application Priority Data
Jul. 14, 2015   (CN) .......................... 2015 1 0412712

(51) Int. Cl.
*G06F 1/16*      (2006.01)
*G06F 13/42*    (2006.01)
*H04B 1/3827*  (2015.01)
(Continued)

(52) U.S. Cl.
CPC .......... *G06F 13/4282* (2013.01); *G06F 1/163* (2013.01); *H02J 7/0052* (2013.01);
(Continued)

(58) Field of Classification Search
CPC ....................................................... G06F 1/163
See application file for complete search history.

(56) References Cited

U.S. PATENT DOCUMENTS

2004/0151071 A1* 8/2004 Kocher ................... G06F 1/163
368/10
2013/0145071 A1* 6/2013 Chu ....................... G06F 13/385
710/313
(Continued)

FOREIGN PATENT DOCUMENTS

CN   203607653 U   5/2014
CN   203721195 U   7/2014
(Continued)

OTHER PUBLICATIONS

Machine Translation and Abstract of Chinese Publication No. CN104578301, Apr. 29, 2015, 7 pages.
(Continued)

*Primary Examiner* — Farley Abad
(74) *Attorney, Agent, or Firm* — Conley Rose, P.C.

(57) ABSTRACT

A wearable device includes a device carrier, a device core unit, a first universal serial bus (USB) interface, a second USB interface, and a signal path selection unit. The device carrier is configured to carry the device core unit, the first USB interface, the second USB interface, and the signal path selection unit of the wearable device; the device core unit is configured to perform a core function of the wearable device; the first USB interface and the second USB interface are configured to connect to an external device; the signal path selection unit is configured to control a signal path between the first USB interface and the device core unit or a signal path between the first USB interface and the second USB interface to be connected.

12 Claims, 4 Drawing Sheets

(51) Int. Cl.
*H04B 1/3888* (2015.01)
*H02J 7/00* (2006.01)

(52) U.S. Cl.
CPC .......... *H04B 1/385* (2013.01); *H04B 1/3888* (2013.01); *G06F 2213/0042* (2013.01); *H02J 2007/006* (2013.01); *H02J 2007/0062* (2013.01); *H02J 2007/0096* (2013.01); *H04B 2001/3861* (2013.01)

(56) References Cited

U.S. PATENT DOCUMENTS

| | | | |
|---|---|---|---|
| 2015/0019769 A1 | 1/2015 | Bapseres | |
| 2015/0277401 A1* | 10/2015 | Hsiao | G05B 15/02 700/40 |
| 2016/0313270 A1* | 10/2016 | Connell | G01R 31/00 |

FOREIGN PATENT DOCUMENTS

| | | | |
|---|---|---|---|
| CN | 204167616 U | 2/2015 | |
| CN | 104578301 A | 4/2015 | |
| CN | 204290954 U | 4/2015 | |
| CN | 104701699 A | 6/2015 | |
| CN | 104702265 A | 6/2015 | |
| EP | 1970794 A1 | 9/2008 | |

OTHER PUBLICATIONS

Machine Translation and Abstract of Chinese Publication No. CN204167616, Feb. 18, 2015, 5 pages.
Machine Translation and Abstract of Chinese Publication No. CN204290954, Apr. 22, 2015, 5 pages.
Foreign Communication From a Counterpart Application, PCT Application No. PCT/CN2016/089817, English Translation of International Search Report dated Oct. 17, 2016, 2 pages.
Machine Translation and Abstract of Chinese Publication No. CN104701699, Jun. 10, 2015, 6 pages.
Machine Translation and Abstract of Chinese Publication No. CN104702265, Jun. 10, 2015, 5 pages.
Machine Translation and Abstract of Chinese Publication No. CN203607653, May 21, 2014, 6 pages.
Machine Translation and Abstract of Chinese Publication No. CN203721195, Jul. 16, 2014, 19 pages.
Foreign Communication From a Counterpart Application, Chinese Application No. 201510412712.9, Chinese Office Action dated Mar. 23, 2018, 7 pages.
Foreign Communication From a Counterpart Application, European Application No. 16823882.2, Extended European Search Report dated Apr. 20, 2018, 7 pages.

* cited by examiner

WEARABLE DEVICE

This application is a national stage application of International Patent Application No. PCT/CN2016/089817, filed on Jul. 12, 2016, which claims priority to Chinese Patent Application No. 201510412712.9, filed with the Chinese Patent Office on Jul. 14, 2015 and entitled "WEARABLE DEVICE". The disclosures of the aforementioned applications are hereby incorporated herein by reference in their entireties.

TECHNICAL FIELD

The present disclosure relates to the field of electronic technologies, and in particular, to a wearable device.

BACKGROUND

With development of electronic technologies, daily life and work of people rely more on portable mobile devices, for example, mobile phones, tablet computers, digital cameras, and mobile power packs. Power cables and data cables of such portable mobile devices mostly use a universal serial bus (USB) cable shown in FIG. 1. Therefore, people usually carry a USB cable with them in case of need. However, portability of the USB cable shown in FIG. 1 is relatively poor. Moreover, such conventional USB cables are different in length and thickness, making it difficult to bundle and neaten, and causing a lot of trouble to trips of people. At present, wearable devices become more popular, and are easy to carry, but such a feature fails to bring convenience to other devices.

SUMMARY

Embodiments of the present disclosure provide a wearable device, to perform a USB cable function while functioning as a wearable device.

According to a first aspect, a wearable device is provided, including a device carrier, a device core unit, a first USB interface, a second USB interface, and a signal path selection unit, where the device carrier is configured to carry the device core unit, the first USB interface, the second USB interface, and the signal path selection unit of the wearable device, so that the device is wearable; the device core unit is configured to perform a core function of the wearable device; the first USB interface and the second USB interface are configured to connect to an external device; and the signal path selection unit is configured to control a signal path between the first USB interface and the device core unit or a signal path between the first USB interface and the second USB interface to be connected.

With reference to the first aspect, in a first possible implementation, the device core unit is further configured to output a gating control signal to the signal path selection unit; and the signal path selection unit is configured to control, according to the gating control signal that is output by the device core unit, the signal path between the first USB interface and the device core unit or the signal path between the first USB interface and the second USB interface to be connected.

With reference to the first aspect, in a second possible implementation, the signal path selection unit is configured to control the signal path between the first USB interface and the device core unit to be connected when the device core unit is not separated from the device carrier; and control the signal path between the first USB interface and the second USB interface to be connected when the device core unit is separated from the device carrier.

With reference to the second implementation of the first aspect, in a third possible implementation, the device core unit is further configured to output an in-position indication signal to the signal path selection unit when the device core unit is not separated from the device carrier; and the signal path selection unit is configured to control the signal path between the first USB interface and the device core unit to be connected when receiving the in-position indication signal; and control the signal path between the first USB interface and the second USB interface to be connected when failing to receive the in-position indication signal.

With reference to the first aspect, the first possible implementation of the first aspect, the second possible implementation of the first aspect, or the third possible implementation of the first aspect, in a fourth implementation, the signal path includes at least one of a power signal path or a data signal path.

With reference to the first aspect, the first possible implementation of the first aspect, the second possible implementation of the first aspect, the third possible implementation of the first aspect, or the fourth possible implementation of the first aspect, in a fifth possible implementation, the wearable device is a smart band.

With reference to the fifth possible implementation of the first aspect, in a sixth possible implementation, the device carrier is a wristband, and the first USB interface and the second USB interface are separately disposed at two ends of the wristband.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation, the first USB interface is a USB A-Type (USB A) interface.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation, in an eighth possible implementation, the second USB interface is a micro USB B-Type (micro USB B) interface.

According to the wearable device provided in the first aspect, when the signal path selection unit controls the signal path between the first USB interface and the second USB interface to be connected, the wearable device can perform a USB cable function, and is easy to carry and use.

BRIEF DESCRIPTION OF DRAWINGS

The drawings are provided to further understand the present disclosure, and they constitute a part of the application. The drawings, along with the embodiments of the present disclosure, are used to explain the present disclosure, and pose no limitation on the present disclosure. In the drawings.

DESCRIPTION OF EMBODIMENTS

To provide an implementation solution for improving portability of USB cables, embodiments of the present disclosure provide a wearable device. The following describes embodiments of the present disclosure with reference to the accompanying drawings of this application. It should be understood that, the embodiments are described herein to merely explain and illustrate the present disclosure, and are not described to limit the present disclosure. Moreover, the embodiments in this application and features in the embodiments can be mutually combined in a condition without inconsistency.

Figure 1:
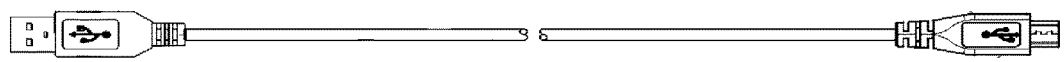
FIG. 1 is a schematic diagram of a USB cable in the prior art.
Figure 2:
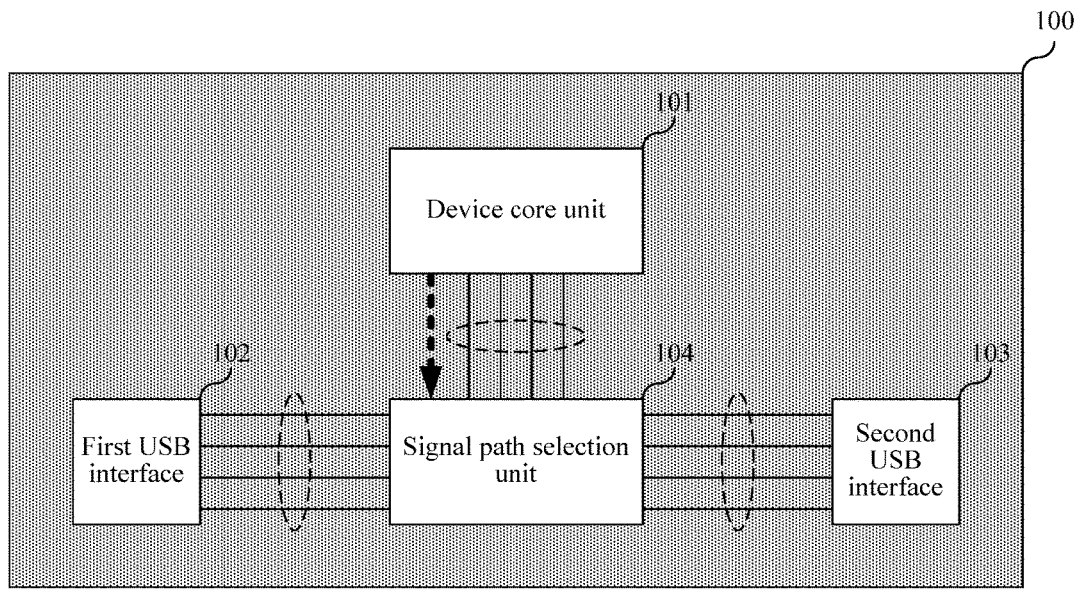
FIG. 2 is a schematic diagram of a wearable device according to an embodiment of the present disclosure.

An embodiment of the present disclosure provides a wearable device. As shown in FIG. 2, the wearable device may include a device carrier 100, a device core unit 101, a first USB interface 102, a second USB interface 103, and a signal path selection unit 104.

The device carrier 100 is configured to carry the device core unit 101, the first USB interface 102, the second USB interface 103, and the signal path selection unit 104 of the wearable device, so that the device is wearable.

The device core unit 101 is configured to perform a core function of the wearable device.

The first USB interface 102 and the second USB interface 103 are configured to connect to an external device.

The signal path selection unit 104 is configured to control a signal path between the first USB interface 102 and the device core unit 101 or a signal path between the first USB interface 102 and the second USB interface 103 to be connected.

That is, the signal path selection unit 104 controls the signal path between the first USB interface 102 and the device core unit 101 to be connected, or controls the signal path between the first USB interface 102 and the second USB interface 103 to be connected.

The wearable device provided in this embodiment of the present disclosure may be any type of wearable device such as a smart band or a smart collar. This is not limited in the present disclosure.

The device carrier 100 in the wearable device carries the other parts included in the wearable device, so that the device is wearable. For example, in the case of a smart band, the device carrier 100 is a wristband.

The device core unit 101 in the wearable device may perform the core function. For example, for smart bands oriented to exercisers, the device core unit 101 may perform functions such as step counting and heart rate measurement.

In this embodiment of the present disclosure, the first USB interface 102 in the wearable device is configured to connect to an external device such as a main communications device or a power device, for example, a computer or a charger. Therefore, the first USB interface 102 may be a USB A interface, and is a male connector of the USB A interface.

In this embodiment of the present disclosure, the second USB interface 103 in the wearable device is configured to connect to an external device such as a portable mobile device, for example, a mobile phone, a tablet computer, or a digital camera. Therefore, the second USB interface 103 may be a micro USB B interface, and is a male connector of the micro USB B interface. Certainly, the second USB interface 103 may also be another portable mobile device interface such as a USB Type-C interface. This is not limited in the present disclosure.

When the signal path between the first USB interface 102 and the device core unit 101 is connected, the first USB interface 102 is a charging interface or a communications interface of the wearable device. When the signal path between the first USB interface 102 and the second USB interface 103 is connected, a signal path between the external device connected to the first USB interface 102 and the external device connected to the second USB interface 103 is connected, so as to meet a charging requirement or a communication requirement of the external device connected to the second USB interface 103. That is, in this case, the wearable device may be used as a power cable or a data cable of another device, thereby achieving a USB cable function.

In an embodiment of the present disclosure, the device core unit 101 outputs a gating control signal to the signal path selection unit 104. The gating control signal is used to instruct the signal path selection unit 104 to select which signal path to be connected.

The signal path selection unit 104 may control, according to the gating control signal that is output by the device core unit 101, the signal path between the first USB interface 102 and the device core unit 101 or the signal path between the first USB interface 102 and the second USB interface 103 to be connected.

In an actual implementation, the device core unit 101 may output the gating control signal when triggered by a button, a mechanical switch, system software, or the like.

In another embodiment of the present disclosure, if the device core unit 101 may be separated from the device carrier 100 in the wearable device, the signal path selection unit 104 may select, according to whether the device core unit 101 is in position, that is, according to whether the device core unit 101 is separated from the device carrier 100, a signal path to be connected.

To meet a charging requirement or a communication requirement of the wearable device, a connection priority of the signal path between the first USB interface 102 and the device core unit 101 is higher than a connection priority of the signal path between the first USB interface 102 and the second USB interface 103.

That is, the signal path selection unit 104 is configured to, when the device core unit 101 is in position, that is, when the device core unit 101 is not separated from the device carrier 100, control the signal path between the first USB interface 102 and the device core unit 101 to be connected; and when the device core unit 101 is not in position, that is, when the device core unit 101 is separated from the device carrier 100, control the signal path between the first USB interface 102 and the second USB interface 103 to be connected.

In an actual implementation, the signal path selection unit 104 may use multiple methods to determine whether the device core unit 101 is in position. For example, the device core unit 101 may output an in-position indication signal to the signal path selection unit 104 when being in position. When receiving the in-position indication signal, the signal path selection unit 104 determines that the device core unit 101 is in position, and controls the signal path between the first USB interface 102 and the device core unit 101 to be connected. When failing to receive the in-position indication signal, the signal path selection unit 104 determines that the device core unit 101 is not in position, and controls the signal path between the first USB interface 102 and the second USB interface 103 to be connected.

The signal paths are both USB signal paths, and may include at least one of a power signal path or a data signal path. That is, the signal paths may include only the power signal path, and in this case, the wearable device provided in this embodiment of the present disclosure can perform a USB power cable function. Alternatively, the signal paths may include only the data signal path, and in this case, the wearable device provided in this embodiment of the present disclosure can perform a USB data cable function. Alternatively, the signal paths may include both the power signal path and the signal path, and in this case, the wearable device provided in this embodiment of the present disclosure can perform both the USB power cable function and the USB data cable function.

The following describes an implementation circuit of the wearable device provided in the embodiments of the present disclosure with reference to the accompanying drawings by using the embodiments.

Embodiment 1

Figure 3:
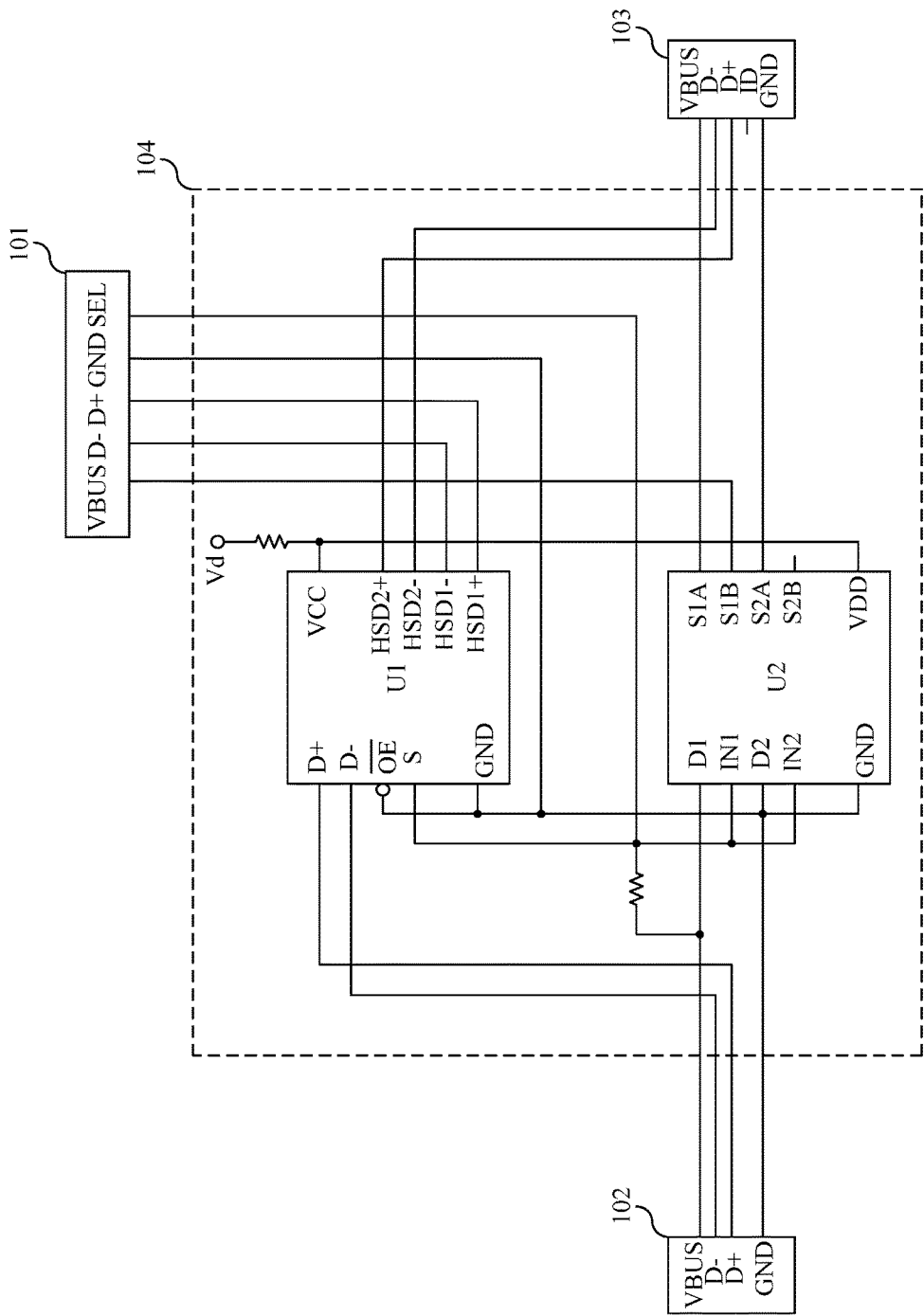
FIG. 3 is a schematic diagram of a wearable device according to Embodiment 1 of the present disclosure.

An implementation circuit of a wearable device provided in Embodiment 1 of the present disclosure is shown in FIG. 3. In the wearable device, a device core unit 101 may be separated from a device carrier 100. A SEL pin of the device core unit 101 outputs a low-level signal when the device core unit 101 is in position, and the SEL pin outputs a high-level signal when the device core unit 101 is not in position. That is, an in-position indication signal is a low-level signal.

A signal path selection unit 104 controls, according to the output signal of the SEL pin of the device core unit 101, whether a power signal path or a data signal path to be connected.

The signal path selection unit 104 is implemented by using a chip U1 and a chip U2 that are shown in FIG. 3.

The chip U1 is a high speed USB switch, and is configured to control a data signal path between a first USB interface 102 and the device core unit 101 to be connected when the output signal of the SEL pin of the device core unit 101 is a low-level signal; and control a data signal path between the first USB interface 102 and a second USB interface 103 to be connected when the output signal of the SEL pin of the device core unit 101 is a high-level signal.

The chip U2 is a single pole, double throw switch with minimum path internal resistance, and is configured to control a power signal path between the first USB interface 102 and the device core unit 101 to be connected when the output signal of the SEL pin of the device core unit 101 is a low-level signal; and control a power signal path between the first USB interface 102 and the second USB interface 103 to be connected when the output signal of the SEL pin of the device core unit 101 is a high-level signal.

Embodiment 2

Figure 4:
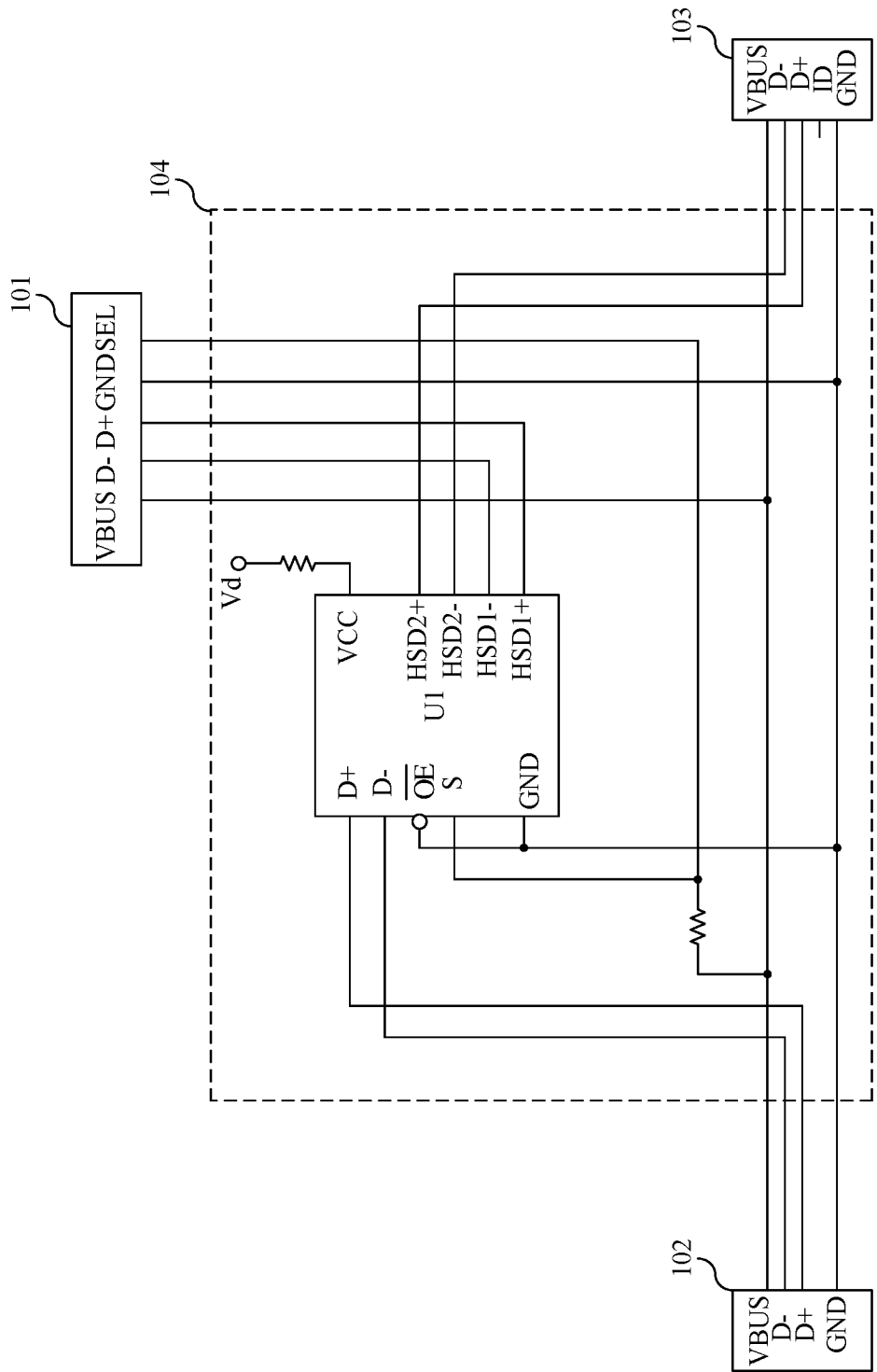
FIG. 4 is a schematic diagram of a wearable device according to Embodiment 2 of the present disclosure.

An implementation circuit of parts in a wearable device provided in Embodiment 2 of the present disclosure is shown in FIG. 4. In the wearable device, a device core unit 101 may be separated from a device carrier 100. A SEL pin of the device core unit 101 outputs a low-level signal when the device core unit 101 is in position, and the SEL pin outputs a high-level signal when the device core unit 101 is not in position. That is, an in-position indication signal is a low-level signal.

A power signal path between a first USB interface 102 and the device core unit 101 and a power signal path between the first USB interface 102 and a second USB interface 103 are both connected. A signal path selection unit 104 controls, according to the output signal of the SEL pin of the device core unit 101, whether a data signal path to be connected.

In this case, the signal path selection unit 104 needs to be implemented by using only one high speed USB switch. Control logic is the same as that in the foregoing embodiment, and details are not described herein again.

It should be noted that, Embodiment 1 and Embodiment 2 are merely two examples, and are not used to limit an implementation circuit of the wearable device provided in the embodiments of the present disclosure.

Figure 5:
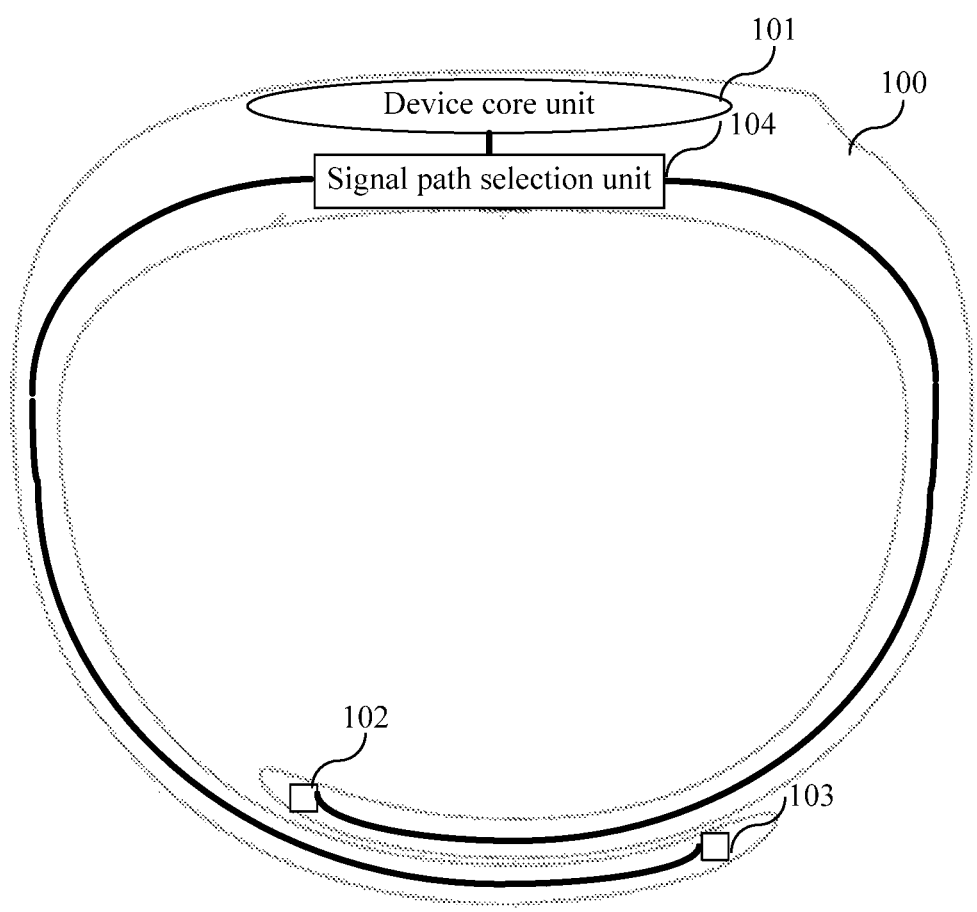
FIG. 5 is a schematic diagram of a smart band according to an embodiment of the present disclosure.

If the wearable device provided in the embodiments of the present disclosure is a smart band, as shown in FIG. 5, in this case, the device carrier 100 is a wristband, a USB signal cable may be hidden in the wristband in a Flexible Printed Circuit (FPC) form, and the first USB interface 102 and the second USB interface 103 may be separately disposed at two ends of the wristband.

Certainly, the wearable device provided in the embodiments of the present disclosure may be another wearable device such as a smart collar, and this is not illustrated herein.

Based on the above, a USB cable function is hidden in the wearable device provided in the embodiments of the present disclosure, making it easy to carry and use. This avoids problems of existing USB cables such as poor portability, space occupation, and difficulty in neatening, and may improve user experience.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:
1. A wearable device, comprising:
   a device carrier:
   a device core unit;
   a first universal serial bus (USB) interface;
   a second USB interface; and
   a signal path selection unit coupled to each of the first USB interface, the second USB interface, and the device core unit,
   wherein the device carrier is configured to carry the device core unit, the first USB interface, the second USB interface, and the signal path selection unit of the wearable device,
   wherein the first USB interface and the second USB interface are configured to connect the wearable device to an external device, and
   wherein the signal path selection unit is configured to connect a signal path between the first USB interface and the device core unit when the device core unit is not separated from the device carrier, and connect a signal path between the first USB interface and the second USB interface when the device core unit is separated from the device carrier.

2. The wearable device according to claim 1, wherein the device core unit is configured to output an in-position indication signal to the signal path selection unit when the device core unit is not separated from the device carrier, and wherein the signal path selection unit is configured to:
- connect the signal path between the first USB interface and the device core unit when receiving the in-position indication signal; and
- connect the signal path between the first USB interface and the second USB interface when failing to receive the in-position indication signal.

3. The wearable device according to claim 2, wherein the signal path comprises at least one of a power signal path or a data signal path.

4. The wearable device according to claim 2, wherein the wearable device is a smart band.

5. The wearable device according to claim 2, wherein the first USB interface is a USB A-type interface.

6. The wearable device according to claim 1, wherein the signal path comprises at least one of a power signal path and a data signal path.

7. The wearable device according to claim 6, wherein the wearable device is a smart band.

8. The wearable device according to claim 6, wherein the first USB interface is a USB A-type interface.

9. The wearable device according to claim 1, wherein the wearable device is a smart band.

10. The wearable device according to claim 9, wherein the device carrier is a wristband, and wherein the first USB interface and the second USB interface are separately disposed at two ends of the wristband.

11. The wearable device according to claim 1, wherein the first USB interface is a USB A-type interface.

12. The wearable device according to claim 1, wherein the second USB interface is a micro USB B-type interface.

* * * * *